(12) United States Patent
Aoki et al.

(10) Patent No.: US 9,207,452 B2
(45) Date of Patent: Dec. 8, 2015

(54) LIGHT SCANNING APPARATUS

(71) Applicant: CANON KABUSHIKI KAISHA, Tokyo (JP)

(72) Inventors: Kota Aoki, Toride (JP); Yasuaki Otoguro, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 215 days.

(21) Appl. No.: 13/708,340

(22) Filed: Dec. 7, 2012

(65) Prior Publication Data

US 2013/0155478 A1 Jun. 20, 2013

(30) Foreign Application Priority Data

Dec. 20, 2011 (JP) ................... 2011-278542

(51) Int. Cl.
*G02B 26/08* (2006.01)
*G02B 26/10* (2006.01)
*G02B 26/12* (2006.01)
*G02B 27/00* (2006.01)

(52) U.S. Cl.
CPC .............. *G02B 26/10* (2013.01); *G02B 26/125* (2013.01); *G02B 27/0006* (2013.01)

(58) Field of Classification Search
CPC .. G02B 26/10; G02B 26/125; G02B 27/0006; H04N 1/1135; G01S 7/4813
USPC ............... 359/196.1–226.2; 347/241–245, 347/256–261
See application file for complete search history.

(56) References Cited

U.S. PATENT DOCUMENTS

2007/0024943 A1* 2/2007 Namba ..................... 359/216
2008/0118287 A1* 5/2008 Masaki et al. ............ 399/350

FOREIGN PATENT DOCUMENTS

| JP | 63-155129 (U) | 10/1988 |
| JP | 10-123444 | 5/1998 |
| JP | 2001-091887 | 4/2001 |
| JP | 2003-295359 | 10/2003 |
| JP | 2008-257040 | 10/2008 |
| JP | 2009-271456 A | 11/2009 |

* cited by examiner

*Primary Examiner* — James Phan
(74) *Attorney, Agent, or Firm* — Fitzpatrick, Cella, Harper & Scinto (57) ABSTRACT

A light scanning apparatus, including: a light source configured to emit a light beam; a light deflector configured to deflect the light beam emitted from the light source so that the light beam scans a photosensitive member; a housing which contains the light source and the light deflector, and which is provided with an opening portion through which the light beam deflected by the light deflector passes; a transparent member mounted on the housing to close the opening portion and configured to transmit the light beam deflected by the light deflector; and a fixing member having an elastic portion configured to cover an outer circumferential portion of the transparent member, the fixing member being configured to fix the transparent member to the housing by pressing the elastic portion to the transparent member.

11 Claims, 6 Drawing Sheets

LIGHT SCANNING APPARATUS

BACKGROUND OF THE INVENTION

1. Field of the Invention

The present invention relates to a light scanning apparatus.

2. Description of the Related Art

Figure 6A:
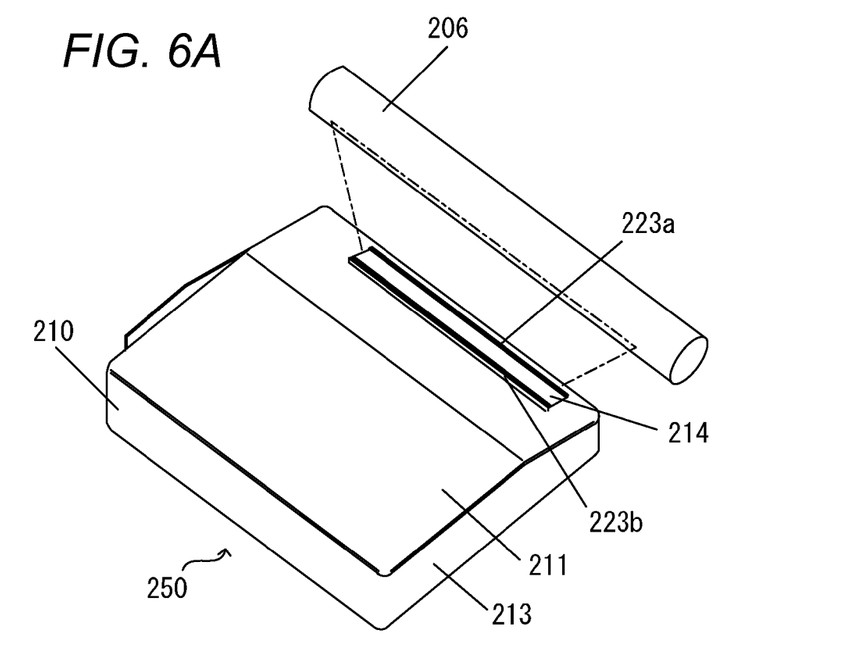
FIGS. 6A and 6B are perspective views of a conventional light scanning apparatus.
Figure 6B:
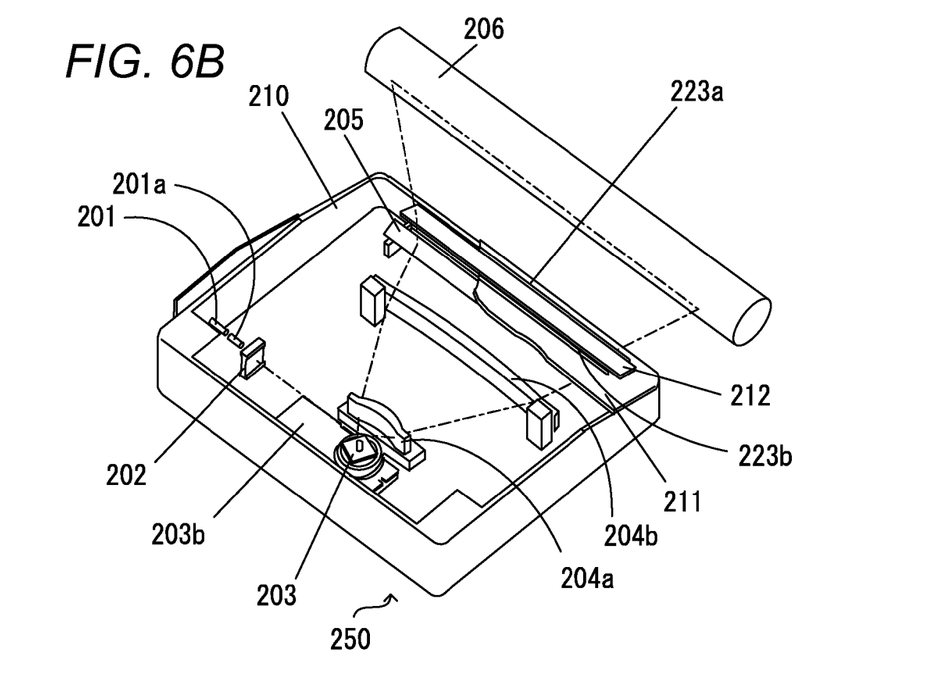

There is an electrophotographic image forming apparatus (not shown) including a light scanning apparatus 250 illustrated in FIGS. 6A and 6B. FIGS. 6A and 6B are perspective views illustrating a configuration of the conventional light scanning apparatus 250 disclosed in Japanese Patent Application Laid-Open No. 2009-271456. FIG. 6A illustrates the light scanning apparatus 250 with a cover 211 closed, and FIG. 6B illustrates the light scanning apparatus 250 with a part of the cover 211 cut out.

The light scanning apparatus 250 includes a housing 213 which includes an optical casing 210 and the cover 211 that hermetically seals the optical casing 210. As illustrated in FIG. 6B, the optical casing 210 contains a semiconductor laser device 201, a collimator lens 201a, a cylindrical lens 202, a rotary polygon mirror 203, a scanner motor 203b, imaging lenses 204a and 204b, and a mirror 205.

The semiconductor laser device 201 emits laser light in accordance with image information input from the outside. The collimator lens 201a collimates the laser light emitted from the semiconductor laser device 201 and outputs a collimated laser light. The cylindrical lens 202 condenses the collimated laser light collimated by the collimator lens 201a on a reflection surface of the rotary polygon mirror 203 in a line shape. The scanner motor 203b rotates the rotary polygon mirror 203. The laser light condensed on the reflection surface of the rotary polygon mirror 203 in a line shape is reflected and deflected by the reflection surface. The reflected and deflected laser light passes through the imaging lenses 204a and 204b, and is reflected at the mirror 205, thus irradiating a photosensitive drum 206 with the laser light via an opening portion 214 of the cover 211 and a dust-proof glass plate 212.

The imaging lenses 204a and 204b functions to image the laser light reflected and deflected by the rotary polygon mirror 203 on the photosensitive drum 206. With rotation of the rotary polygon mirror 203 by the scanner motor 203b, main scanning is performed on the photosensitive drum 206 by the laser light. Further, with rotation driving of the photosensitive drum 206 about an axis of the photosensitive drum 206, sub scanning is performed by the laser light. That is, the imaging lenses 204a and 204b are designed to condense the laser light reflected and deflected by the rotary polygon mirror 203 on the photosensitive drum 206 to form a spot, and to maintain a constant scanning speed of the spot. In this manner, the rotary polygon mirror 203 scans the laser light emitted from the semiconductor laser device 201 on the photosensitive drum 206.

The surface of the photosensitive drum 206 is uniformly charged by a charging device (not shown). The laser light emitted from the semiconductor laser device 201 forms an electrostatic latent image on the photosensitive drum 206 by scanning and exposing the surface of the photosensitive drum 206 that is uniformly charged. Toner is adhered to the electrostatic latent image formed in this manner by a developing device (not shown) so that the electrostatic latent image is developed into a toner image. The toner image developed in this manner is transferred onto a recording medium (not shown) so that an image is formed on the recording medium.

A light intensity of the laser light which scans and exposes the photosensitive drum 206 is related to a density of the toner image. When the light intensity of the laser light is changed temporally or spatially unlike what is intended, the image density on the recording medium may become partially weak or strong, causing a so-called "uneven density". In particular, when an optical element in the light scanning apparatus 250 is dirty due to dust adhered thereto, the light intensity of the laser light irradiating the photosensitive drum 206 is partially decreased by the dust blocking the laser light, and as a result, the uneven density occurs.

As illustrated in FIGS. 6A and 6B, the light scanning apparatus 250 includes ribs 223a and 223b which are longer than the opening portion 214 along the longitudinal direction of the opening portion 214. Further, the dust-proof glass plate 212 is adhered to the cover 211 to close the opening portion 214 by applying an adhesive longer than the opening portion 214 in a continuous manner between the rib 223a and the dust-proof glass plate 212 and between the rib 223b and the dust-proof glass plate 212. With this configuration, entry of the dust into the light scanning apparatus 250 through the opening portion 214 is prevented.

As described above, in the conventional light scanning apparatus, the dust-proof glass plate (transparent member) and a housing are bonded to each other with an adhesive. Therefore, if the adhesive is erroneously applied on a portion of the transparent member through which the laser light is transmitted, the adhesive may block the laser light scanning the photosensitive drum (image bearing member), possibly causing an uneven image. In order to avoid this situation, the adhesive needs to be applied in an elaborate manner, and thus the adhesive applying work is time-consuming.

SUMMARY OF THE INVENTION

In view of the above, the present invention provides a light scanning apparatus in which a transparent member is mounted on a housing to close an opening portion without using an adhesive so that dust can be prevented from entering the light scanning apparatus from the side of the transparent member through the opening portion.

According to an exemplary embodiment of the present invention, there is provided a light scanning apparatus, including: a light source configured to emit a light beam; a light deflector configured to deflect the light beam emitted from the light source so that the light beam scans a photosensitive member; a housing which contains the light source and the light deflector, and which is provided with an opening portion through which the light beam deflected by the light deflector passes; a transparent member mounted on the housing to close the opening portion and configured to transmit the light beam deflected by the light deflector; and a fixing member having an elastic portion configured to cover an outer circumferential portion of the transparent member, the fixing member being configured to fix the transparent member to the housing by pressing the elastic portion against the transparent member.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
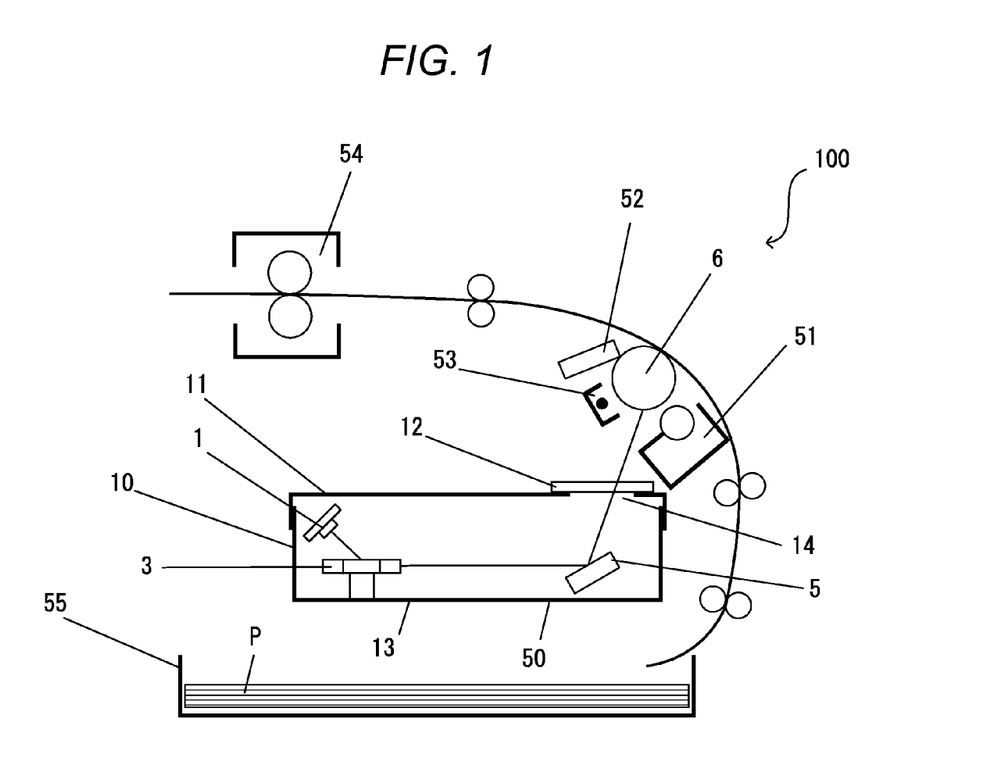
FIG. 1 is a schematic cross-sectional view of an image forming apparatus including a light scanning apparatus according to a first embodiment.

FIG. 1 is a schematic cross-sectional view of an electrophotographic image forming apparatus 100 including a light scanning apparatus 50 according to a first embodiment. The electrophotographic image forming apparatus 100 is used, for example, as an electrophotographic copying machine, an electrophotographic printer (laser beam printer), a facsimile machine, and a multifunction peripheral. In the following, the first embodiment will be described by using a laser beam printer as the electrophotographic image forming apparatus (hereinafter, referred to as an "image forming apparatus") 100.

The light scanning apparatus 50 provided in the image forming apparatus 100 includes a housing 13 which comprises an optical casing 10 and a cover 11 which hermetically seals the optical casing 10. The light scanning apparatus 50 contains various optical elements such as a semiconductor laser device (light source) 1, a rotary polygon mirror (light deflector) 3, and a mirror (optical member) 5 in the housing 13. An elongated opening portion 14 is formed in the cover 11, and a dust-proof glass plate 12 which is a transparent member (transparent member) is mounted on the cover 11 to close the opening portion 14. Accordingly, the dust-proof glass plate 12 is also formed in an elongated shape, which is particularly a glass member of a thin rectangular plate, allows the laser light (light beam) to be transmitted, and protects the optical elements in the housing 13 from being contaminated by dust. Although the opening portion 14 is formed in the cover 11 in the first embodiment, the light scanning apparatus 50 may be designed so that the opening portion 14 is formed in the optical casing 10. In this case, for example, the dust-proof glass plate may be mounted on the optical casing to close the opening portion formed in the optical casing.

The laser light emitted from the semiconductor laser device 1 is reflected and deflected by the rotary polygon mirror 3. The deflected laser light is reflected by the mirror 5 and passes through the opening portion 14 and the dust-proof glass plate 12 so that an image bearing member (photosensitive member) 6 is irradiated with the laser light. In this manner, the rotary polygon mirror 3 scans the laser light emitted from the semiconductor laser device 1 on the image bearing member 6. The surface of the image bearing member 6 is uniformly charged by a charging device 53. The laser light scans and exposes the surface of the image bearing member 6 which is uniformly charged so that an electrostatic latent image is formed on the image bearing member 6. A developing device 51 causes toner to adhere to the electrostatic latent image to develop the electrostatic latent image into a toner image. The toner image is transferred onto a recording medium P which is fed from a sheet feeding cassette 55. After that, the toner image is fixed to the recording medium P by a fixing device 54, and then the recording medium P is discharged outside the image forming apparatus 100. The toner remaining on the image bearing member 6 without being transferred onto the recording medium P is removed by a cleaning device 52.

Figure 2A:
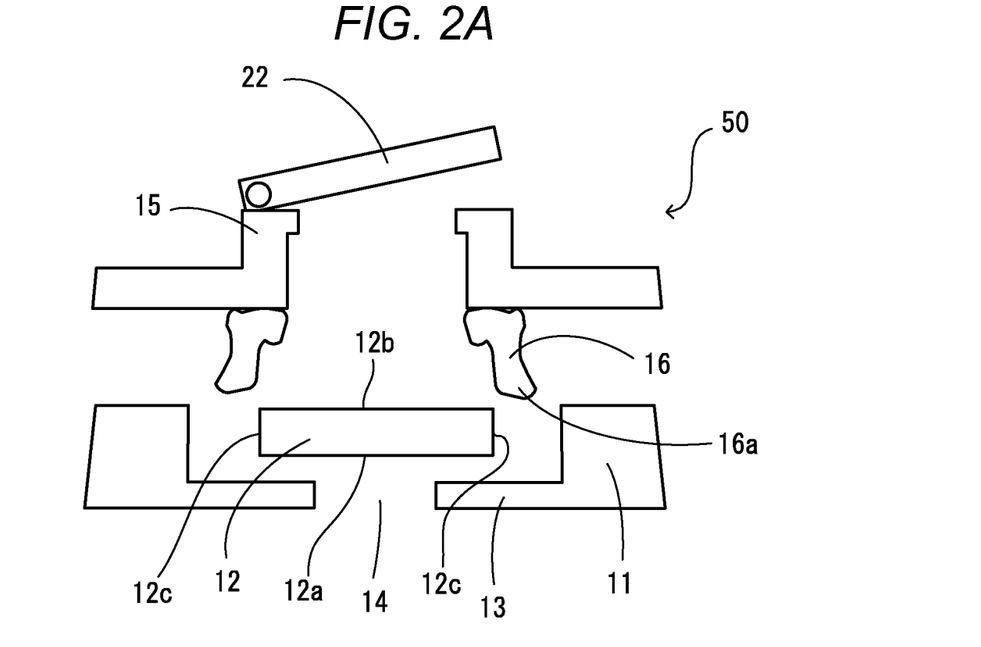
FIGS. 2A and 2B are partial cross-sectional views of the light scanning apparatus according to the first embodiment.
Figure 2B:
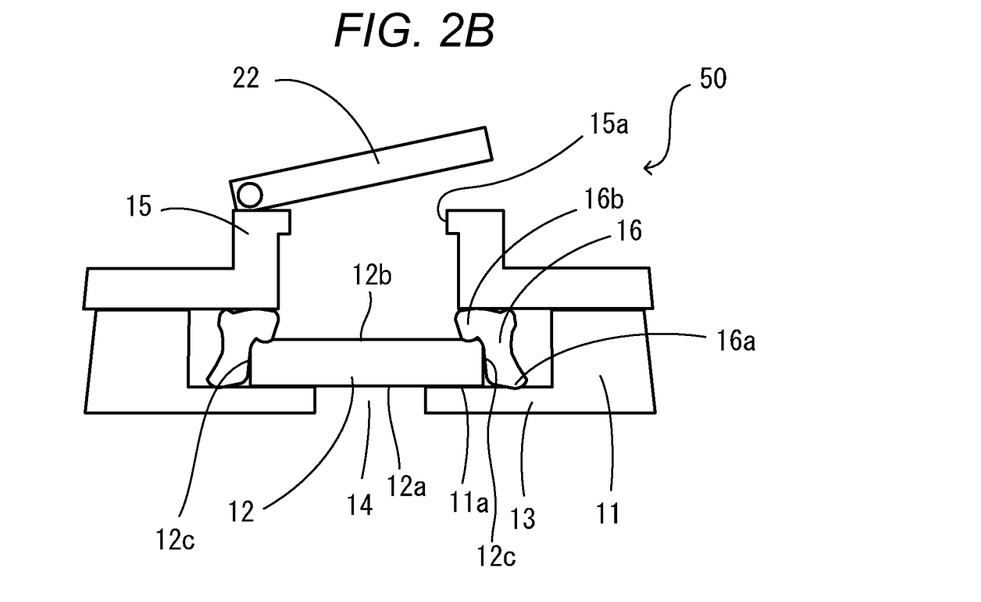

FIGS. 2A and 2B are partial cross-sectional views respectively illustrating states of before and after mounting the dust-proof glass plate 12 on the cover 11 in the light scanning apparatus 50 provided in the image forming apparatus 100. FIGS. 2A and 2B are cross-sectional views taken along a direction perpendicular to the longitudinal direction of the opening portion 14.

As illustrated in FIG. 2B, when the dust-proof glass plate 12 is mounted on the cover 11, a fixing member is mounted on the cover 11, and an elastic member (dustproof member, elastic portion) 16 is disposed to cover an outer circumferential portion of the dust-proof glass plate 12. Therefore, the dust-proof glass plate 12 is interposed between the fixing member 15 and the cover 11 through the elastic member 16. The fixing member 15 presses the elastic member 16 to the outer circumferential portion of the dust-proof glass plate 12, thus fixing the dust-proof glass plate 12 to the cover 11 of the housing 13. The outer circumferential portion herein refers to a portion which is on a side of an exit surface 12b from which the laser light entering an incident surface 12a of the dust-proof glass plate 12 from the inside of the light scanning apparatus 50 exits and does not block the laser light exiting from the exit surface 12b, and also refers to a side surface 12c of the dust-proof glass plate 12. With this configuration, the dust-proof glass plate 12 closes the opening portion 14, and a gap between the dust-proof glass plate 12 and the cover 11 is sealed by the elastic member 16 which is elastically deformed, with the result that the dust can be prevented from entering the light scanning apparatus 50 from the side of the dust-proof glass plate 12 through the opening portion 14.

As the elastic member 16, for example, a styrene elastomer resin is used. The elastomer resin is flexible, and hence, when the elastic member 16 is pressed to the cover 11, a pressure exerted on the cover 11 can be reduced. Therefore, deformation of the cover 11 can be reduced while securing the sealing performance.

Further, the elastic member 16 can be formed integrally with the fixing member 15. When the elastic member 16 is formed integrally with the fixing member 15, assembly of the fixing member 15 and the elastic member 16 with respect to the cover 11 and the dust-proof glass plate 12 can be performed in an easy manner.

As illustrated in FIG. 2B, a tip end portion (one end portion) 16a of the elastic member 16 is extended toward the outside of the dust-proof glass plate 12. The tip end portion 16a of the elastic member 16 is brought into contact with the cover 11. A base end portion (another end portion) 16b of the elastic member 16 is brought into contact with the outer circumferential portion of the dust-proof glass plate 12. The base end portion 16b of the elastic member 16 presses the dust-proof glass plate 12 to the cover 11, thus fixing the dust-proof glass plate 12. The elastic member 16 seals the gap between the dust-proof glass plate 12 and the cover 11 by surrounding the outer circumference of the dust-proof glass plate 12.

The tip end portion 16a of the elastic member 16 is extended toward the outside of the dust-proof glass plate 12, and hence the elastic member 16 is not sandwiched between the dust-proof glass plate 12 and a contact portion 11a of the cover 11 at which the dust-proof glass plate 12 is brought into contact with the cover 11. Therefore, according to the first embodiment, it is possible to prevent a gap from occurring between the dust-proof glass plate 12 and the cover 11 due to the elastic member 16 being sandwiched between the dustproof glass plate 12 and the cover 11. Thus, according to the first embodiment, it is possible to prevent the dust from entering into the light scanning apparatus 50 from the gap formed by the elastic member 16 being sandwiched between the dust-proof glass plate 12 and the cover 11.

Further, by bringing the tip end portion 16a of the elastic member 16 into contact with the cover 11, repulsive forces between the cover 11 and the dust-proof glass plate 12 and between the cover 11 and the fixing member 15 can be suppressed, and as a result, deformation of the cover 11 can be prevented.

As illustrated in FIG. 2B, a shutter 22 is provided on the fixing member 15. The shutter 22 is configured to open and close an opening portion 15a formed in the fixing member 15. The opening portion 15a of the fixing member 15 is disposed facing the opening portion 14 of the cover 11 through an intermediation of the dust-proof glass plate 12. By closing the opening portion 15a of the fixing member 15 with the shutter 22, the hermetic performance of the light scanning apparatus 50 can be enhanced with a space saving, and the amount of the dust adhered to the surface of the dust-proof glass plate 12 can be reduced. Therefore, according to the first embodiment, generation of an uneven image due to the dust adhering to the dust-proof glass plate 12 can be suppressed.

Figure 3A:
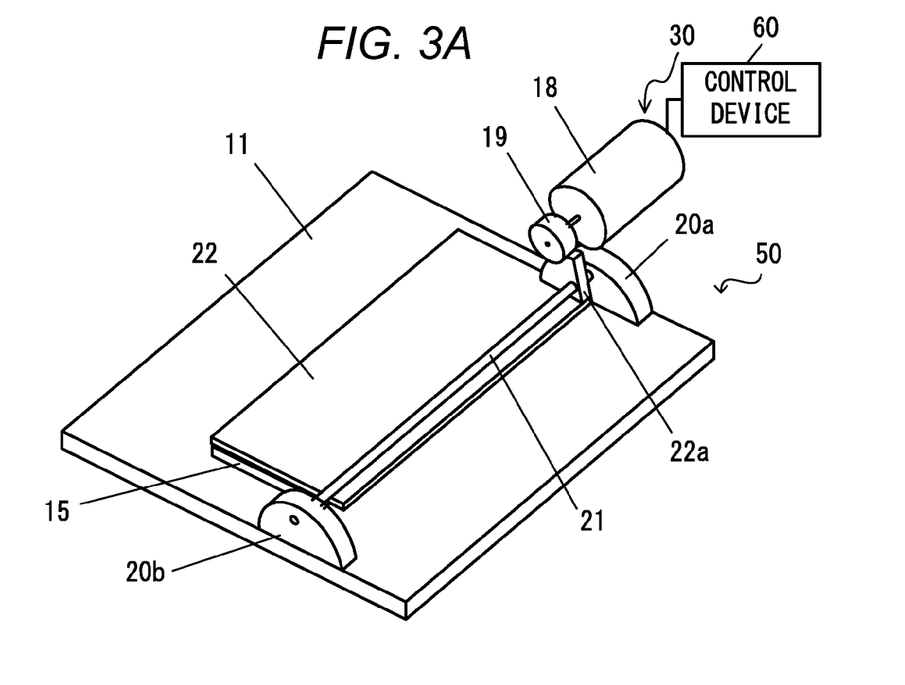
FIGS. 3A and 3B are partial perspective views of the light scanning apparatus according to the first embodiment.
Figure 3B:
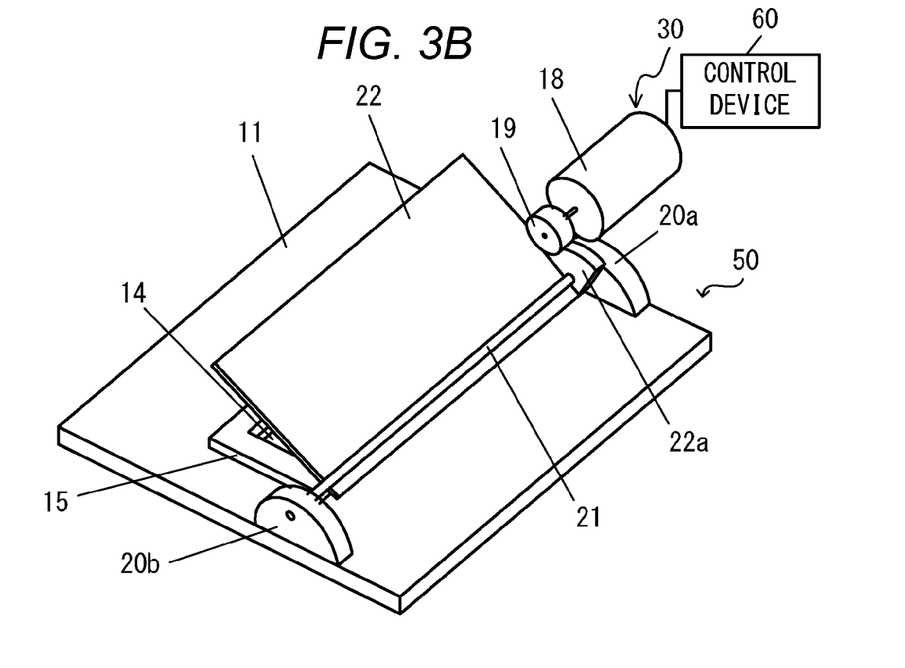

FIGS. 3A and 3B illustrate an opening and closing mechanism 30 configured to open and close the shutter 22 in the light scanning apparatus 50. FIG. 3A is a partial perspective view of the light scanning apparatus 50 in a state in which the shutter 22 is closed, and FIG. 3B is a partial perspective view of the light scanning apparatus 50 in a state in which the shutter 22 is opened by the opening and closing mechanism 30.

The opening and closing mechanism 30 configured to open and close the shutter 22 includes a gear 22a mounted on the shutter 22, a motor 18, and a motor gear 19 mounted on the rotation shaft of the motor 18 to be engaged with the gear 22a. The opening and closing mechanism 30 configured to open and close the shutter 22 further includes bearings 20a and 20b supported by the cover 11 and a shaft 21 which passes through the gear 22a and is fixed to the bearings 20a and 20b. Therefore, by the engagement of the gear 22a and the motor gear 19, the opening and closing of the shutter 22 can be performed in accordance with a rotation direction of the motor gear 19.

Figure 4:
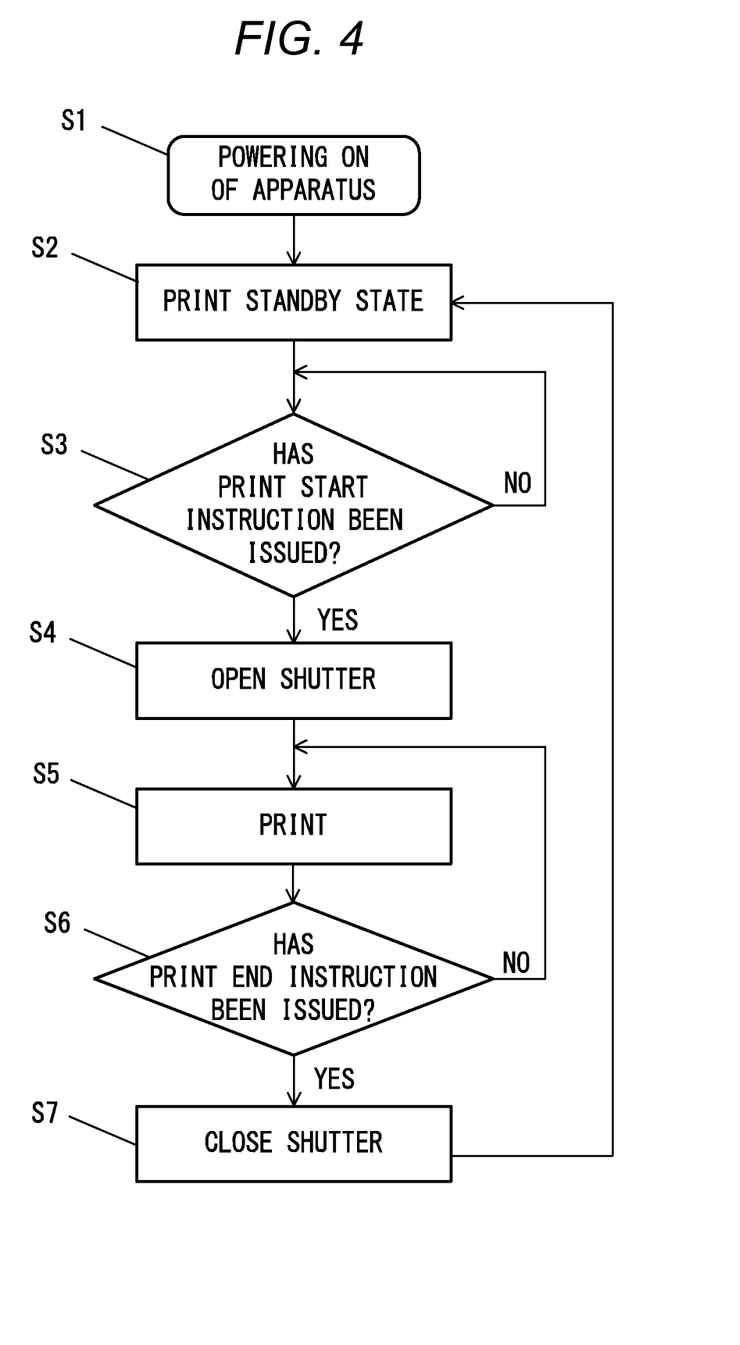
FIG. 4 is a flowchart illustrating control of an opening and closing operation of a shutter of the light scanning apparatus along with a printing operation in the image forming apparatus according to the first embodiment.

FIG. 4 is a flowchart of control of an opening and closing operation of the shutter 22 of the light scanning apparatus 50 along with a printing operation of the image forming apparatus 100 according to the first embodiment.

The opening and closing mechanism 30 configured to open and close the shutter 22 is controlled by a control device 60. The control device 60 is provided in the image forming apparatus 100. As illustrated in FIGS. 3A and 3B, the control device 60 is connected to the motor 18 of the opening and closing mechanism 30, and controls rotation of the motor 18. In the following, the opening and closing operation of the shutter 22 executed by the control device 60 will be described with reference to the flowchart of FIG. 4.

When the image forming apparatus 100 is powered ON (Step S1), the control device 60 sets the image forming apparatus 100 to a print standby state (Step S2). In the print standby state, the control device 60 determines whether or not a print start instruction is issued from a control panel (not shown) of the image forming apparatus 100 or an external apparatus (not shown) (Step S3) to the image forming apparatus 100. When it is determined that the print start instruction is issued (YES in Step S3), the control device 60 drives the motor 18 to open the shutter 22 (Step S4). After that, the print is performed (Step S5) and when a print end instruction is issued (YES in Step S6), the control device 60 drives the motor 18 to close the shutter 22 (Step S7). After that, the image forming apparatus 100 is set to the print standby state again (Step S2).

Figure 5A:
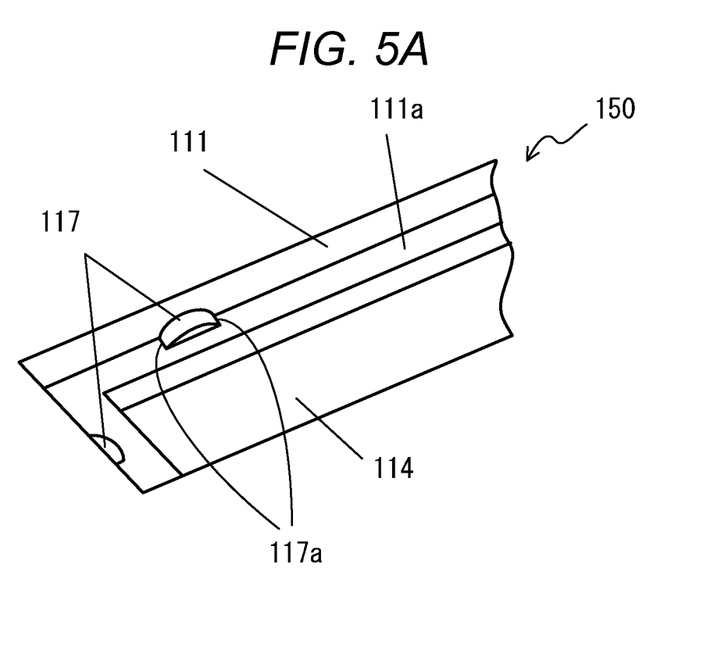
FIGS. 5A and 5B are partial perspective views of a light scanning apparatus according to a second embodiment.
Figure 5B:
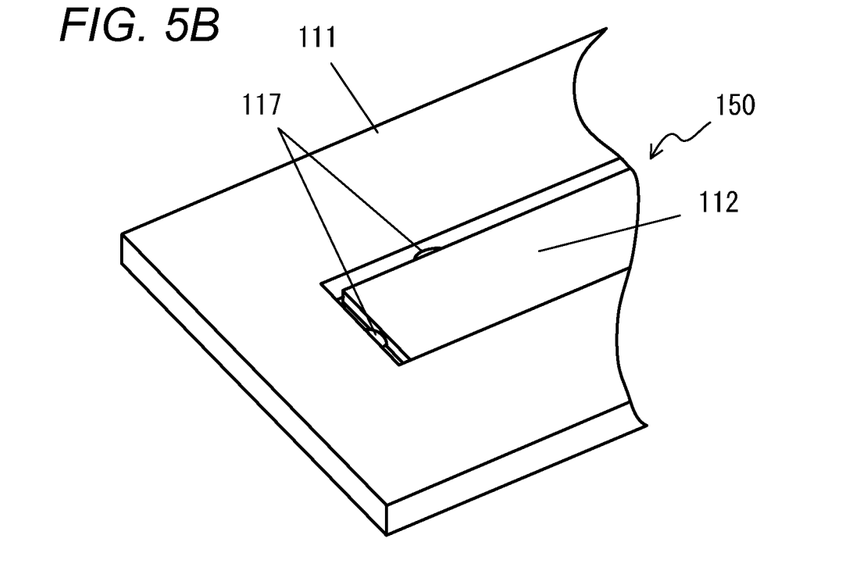

FIGS. 5A and 5B are partial perspective views respectively illustrating states of before and after mounting a dust-proof glass plate 112 on a cover 111 in a light scanning apparatus 150 according to a second embodiment. The light scanning apparatus 150 according to the second embodiment is provided in an image forming apparatus (not shown). The image forming apparatus (not shown) according to the second embodiment is the same as the image forming apparatus 100 according to the first embodiment, and therefore, a description thereof is omitted. The configuration of the light scanning apparatus 150 according to the second embodiment is the same as that of the light scanning apparatus 50 according to the first embodiment except that at least one protruding portion 117 is provided on a circumference of an opening portion 114 of the cover 111.

As illustrated in FIG. 5B, when the dust-proof glass plate 112 is mounted on the cover 111, the dust-proof glass plate 112 is positioned by a part of the outer circumferential portion of the dust-proof glass plate 112 being brought into contact with the protruding portion 117. With this configuration, the position of the dust-proof glass plate 112 with respect to the cover 111 can be determined in an easy manner, and hence the mounting of the dust-proof glass plate 112 to the cover 111 can be performed in an easy manner.

As illustrated in FIGS. 5A and 5B, the height of the plurality of protruding portions 117 is smaller than the height of the dust-proof glass plate 112. Therefore, when an elastic member (not shown) is assembled to the dust-proof glass plate 112, deformation of the elastic member can be reduced. The elastic member seals a gap between the cover 111 and the dust-proof glass plate 112, thus preventing the dust from entering into the light scanning apparatus 150.

An edge portion 117a of the protruding portion 117 is formed into a shape that is smoothly and contiguously connected to a surface 111a of the cover with which the dust-proof glass plate 112 is brought into contact. With this configuration, when the dust-proof glass plate 112 is pressed to the cover 111 by the elastic member, the elastic member is deformed along the above-mentioned shape of the protruding portion 117, and therefore, the deformation of the elastic member can be reduced. Accordingly, the elastic member can seal the gap between the cover 111 and the dust-proof glass plate 112. Therefore, it is possible to prevent a gap from occurring between the dust-proof glass plate 112 and the cover 111, which is caused by the pressing of the dust-proof glass plate 112 to the cover 111 by the elastic member, and hence entry of the dust into the light scanning apparatus 150 from such a gap can be prevented.

According to the embodiments, the elastic member is used to fix the dust-proof glass plate so that the gap between the dust-proof glass plate and the cover is sealed by the elastic member in order to close the opening portion. Hence the dust can be prevented from entering from the side of the dust-proof glass plate through the opening portion into the inside of the light scanning apparatus.

Further, by providing the shutter on the fixing member supported by the cover, the hermetic performance of the light scanning apparatus can be enhanced with a space saving, and the amount of the dust adhering to the surface of the dust-proof glass plate can be reduced.

In the embodiments, the dust-proof glass plate which covers the opening portion formed in the cover will be described. However, for example, the dust-proof glass plate can be mounted on the optical casing to close an opening portion formed in the optical casing. By the fixing member pressing the dust-proof glass plate to cover the opening portion of the optical casing with the elastic member, a gap between the optical casing and the dust-proof glass plate may be sealed by the elastic member. With this configuration, the same effect as the above-mentioned embodiments can be obtained.

According to the embodiments of the present invention, the transparent member is fixed by using the elastic member instead of using an adhesive, and hence the laser light is not blocked by erroneous application of the adhesive on the transparent member, and entry of the dust into the light scanning apparatus can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-278542, filed Dec. 20, 2011, which is hereby incorporated by reference herein in its entirety.

What is claimed is:

1. A light scanning apparatus, comprising:
   a light source attached to the light scanning apparatus and configured to emit a light beam;
   a light deflector configured to deflect the light beam emitted from the light source so that the light beam scans a photosensitive member;
   a housing which contains the light deflector, and which is provided with an opening portion through which the light beam deflected by the light deflector passes;
   a transparent member mounted on the housing to close the opening portion and configured to transmit the light beam deflected by the light deflector; and
   a fixing member having an elastic portion configured to cover an outer circumferential portion of the transparent member and configured to fix the transparent member to the housing by pressing the elastic portion to the transparent member and the housing.

2. A light scanning apparatus according to claim 1, wherein one end portion of the elastic portion is extended toward outside of the transparent member.

3. A light scanning apparatus according to claim 2, wherein the one end portion of the elastic portion contacts with the housing.

4. A light scanning apparatus according to claim 1, wherein the elastic portion is formed integrally with the fixing member.

5. A light scanning apparatus according to claim 1, wherein the elastic portion is made of a styrene elastomer resin.

6. A light scanning apparatus according to claim 1, wherein the fixing member comprises a shutter.

7. A light scanning apparatus according to claim 1, further comprising at least one protruding portion provided on the housing,
   wherein a part of the outer circumferential portion of the transparent member is brought into contact with the at least one protruding portion.

8. A light scanning apparatus according to claim 7, wherein a height of the at least one protruding portion is smaller than a height of the transparent member.

9. A light scanning apparatus according to claim 7, wherein an edge portion of the at least one protruding portion is formed into a shape which is contiguously connected to a surface where the transparent member is brought into contact with the housing.

10. A light scanning apparatus according to claim 1, wherein the elastic portion of the fixing member seals a gap between the transparent member and the housing.

11. A light scanning apparatus according to claim 1, wherein the outer circumferential portion of the transparent member comprises:
    a portion which is on a side of an exit surface of the transparent member from which the light beam exits and which does not block the light beam exiting from the exit surface; and
    a side surface of the transparent member.

* * * * *